Sept. 20, 1932.    G. S. FULCHER    1,878,839
COMPOSITE REFRACTORY ARTICLES AND PROCESS OF MAKING THE SAME
Filed Feb. 28, 1931
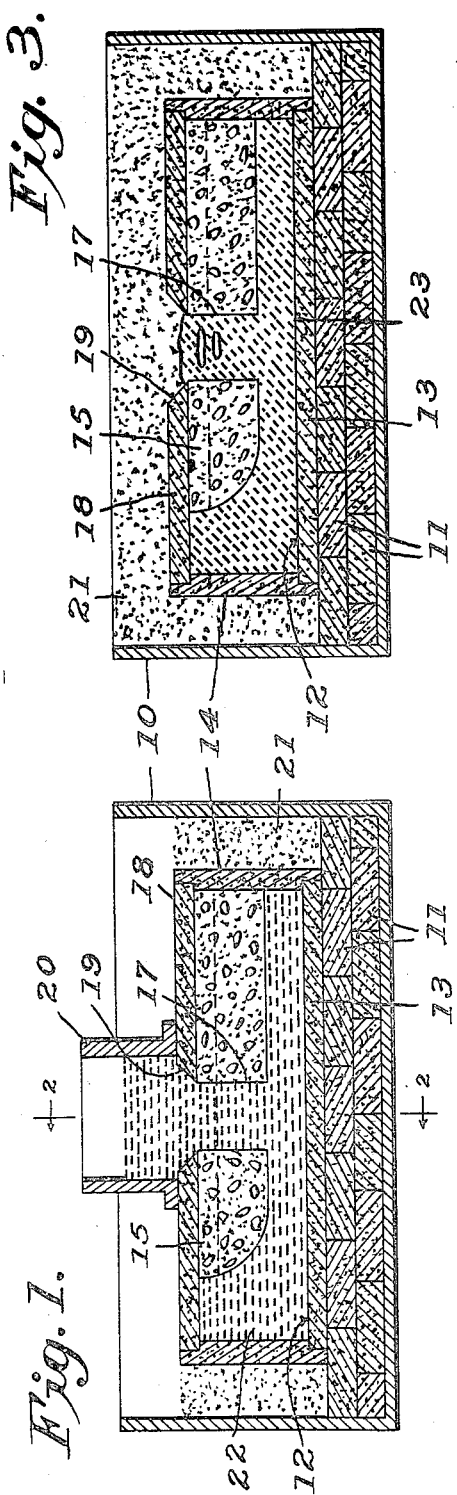
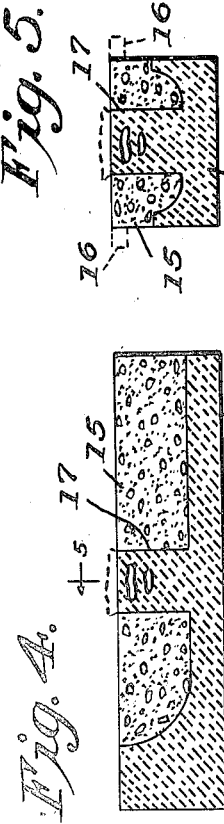
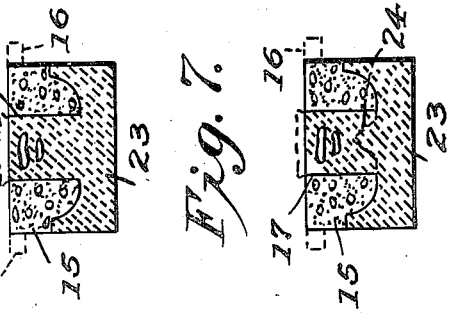
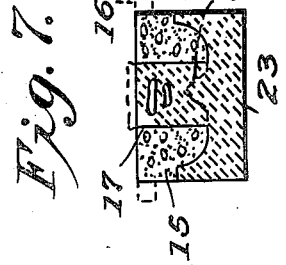
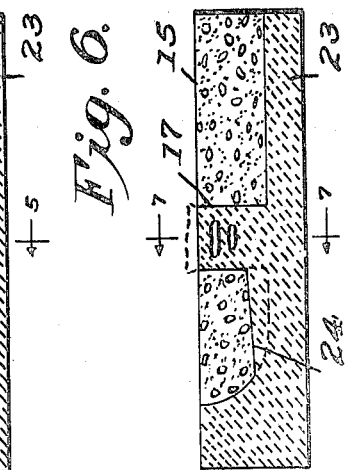
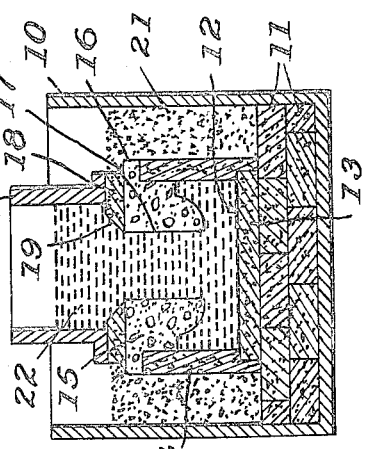
INVENTOR
GORDON S. FULCHER.
BY
Dorsey & Cole
ATTORNEY Patented Sept. 20, 1932

1,878,839

UNITED STATES PATENT OFFICE

GORDON S. FULCHER, OF CORNING, NEW YORK, ASSIGNOR TO CORNING GLASS WORKS, OF CORNING, NEW YORK, A CORPORATION OF NEW YORK

COMPOSITE REFRACTORY ARTICLES AND PROCESS OF MAKING THE SAME

Application filed February 28, 1931. Serial No. 519,162.

This invention relates to composite refractory articles and the method of making them and more particularly to refractory articles for use in glass manufacture.

Various types of tank blocks and other refractory articles have been produced for the purpose of resisting the corrosive action of molten glass. Clay refractories are most commonly used for such purposes and their relatively low resistance to the attack of molten glass necessitates frequent and costly repairs to glass tanks in which such refractories are used. I have found that electrocast refractory blocks such as are shown and described in United States Letters Patent No. 1,615,750, issued to me on January 25, 1927, are better suited to withstand the solvent action of molten glass than the above mentioned clay blocks.

It is well known that the degree of corrosion in a glass melting tank varies in different parts of the tank, for example, with ordinary lime glass the corrosion is usually most severe at the glass line and is relatively slight on the bottom of the tank. Hence, a one inch layer of cast refractory on the bottom of such a tank will in many cases last as long as eight inches or more at the glass line. On account of the high thermal conductivity of cast refractory material it would be desirable to use a thickness sufficient only to compensate for corrosion, that is, to use relatively thin layers to line certain parts of a tank but owing to limitations in the method of producing such material it is relatively difficult and expensive to make thin castings.

In a previous application, Serial No. 312,659, filed by me on October 15, 1928, I have described a method of forming a composite refractory block comprising a sintered refractory backing member and a cast aluminum silicate body fused thereto to form the glass contacting surface of the block. The method there described and illustrated consists in placing the sintered refractory backing member within a suitable mold and disposed upon the bottom thereof and pouring fused aluminum silicate material to fill the mold and then cooling the article in the mold. Since the font and gate hole of the mold are uppermost and since any voids or so-called "pipe" which may tend to form as the molten material solidifies and shrinks will do so at the gate hole, such voids as may form will be located in the glass contacting surface of the finished block.

It is the object of the present invention to produce a composite refractory block of the type above described whose glass contacting surface is free of voids or pipe.

The above and other objects may be attained by the use of my invention which embodies supporting a preformed refractory backing member in the upper part of a suitable mold so as to serve at least in part as the top slab thereof, pouring molten refractory material beneath and around the backing member so that the cast refractory forms on the lower side of the backing member a glass contacting face which is free from the voids that tend to accumulate near the gate hole of the mold.

In the drawing:

Fig. 1 is a longitudinal sectional view through a mold container showing a mold therein, the mold containing a refractory backing member supported from the top of the mold and being filled with liquid refractory material;

Fig. 2 is a cross-sectional view taken on the line 2—2 of Fig. 1 and showing the manner in which the refractory backing member is supported by lugs projecting therefrom and resting on the top of the side walls of the mold;

Fig. 3 is a longitudinal sectional view similar to Fig. 1 showing the mold completely filled with cast refractory material after it has wholly solidified and the font removed;

Fig. 4 is a longitudinal sectional view through a side wall block showing the voids concentrated on the back side of the block;

Fig. 5 is a cross-sectional view taken on the line 5—5 of Fig. 4 showing the supporting lugs of the refractory backing member;

Fig. 6 is a longitudinal sectional view through a side wall black similar to Fig. 4, but showing a groove in the inside face of the refractory backing member for the purpose of removing voids that may tend to form in the interior of the end of the block;

Fig. 7 is a cross-sectional view taken on the line 7—7 of Fig. 6 showing the groove in the inner face of the refractory backing member and the supporting lugs thereof.

In carrying out my invention for producing a composite tank block which is free from voids in its glass contacting face, I provide a mold container 10 with a layer of refractory bricks 11, and I place therein a sand mold 12 composed of a bottom slab 13 and side slabs 14 attached thereto by means of a suitable mold paste.

On top of the side slabs I support a previously formed refractory backing member 15 by means of lugs 16 which project from the sides of the backing member 15 and which rest upon the side slabs 14 in recesses provided therefor as shown in Fig. 2. The backing member is provided with a hole 17 which is of a size suitable to serve as a gate hole. On top of the backing member 15 and the side slabs 14, I place a top slab 18 provided with a hole 19 which coincides with the hole 17 and on the top slab 18 I then place a font mold 20. The space between the mold 12 and the mold container 10 is then filled with insulating material 21 such as sil-o-cel powder and molten refractory material 22 is poured into the sand mold 12 through the font mold 20 and the openings 19 and 17 to fill completely the space in the sand mold 12 which is unoccupied by the backing member 15. The font mold 20 is also filled to provide a reserve supply of molten refractory material which will feed into the mold as the liquid contents of the latter solidify and shrink. The molten refractory material when solidified produces a corrosion resistant facing 23 and any voids which may tend to form due to shrinkage of the molten material on solidifying after the outer surface of the molten refractory material has solidified will be in the gate hole or back side of the block as is shown in Fig. 3 rather than in the glass contacting surface of the block. In order to avoid the possibility of voids forming in the end of the block due to the molten material in the gate hole solidifying before the material in the end of the block has solidified, I may provide a groove 24 in the face of the backing member 15 which will allow a flow of molten material from the upper part of the gate hole to fill any voids which might thus tend to form in the end of the block (Figs. 6 and 7).

After the casting has completely solidified, the font is cracked off and removed and the composite block is covered with insulating material and allowed to cool slowly so that it may anneal itself and remain free from serious cracks.

In the case of thin articles which cool too fast to effect proper annealing, it is necessary to supply additional heat in order to anneal them. This may be done by placing them in an annealing kiln but I have found it more convenient to embed them in the hot insulating powder on top of a recently poured cast refractory tank block.

The refractory backing member 15 may be formed of clay or of any completely or partially sintered refractory material having properties suitable for the purpose, for example, crushed electrocast grains bonded with a small percentage of clay. In order to secure a satisfactory bond between the backing member 15 and the molten refractory material 22 unless the backing member is formed of a material having a very low fusing point, I have found it necessary to bring the molten refractory material into contact with the backing member while the latter is hot. If the backing member is of clay it may have been previously burned and then preheated to the desired temperature. I have also found it satisfactory to heat an unburned clay member to the proper temperature and transfer it while hot directly from the kiln to the mold container. The sintering and burning of the backing member in this case is completed by heat supplied by the cast material. In either event when ordinary clay refractory material is used in producing the backing member 15, I have found that a satisfactory bond may be secured if the backing member is heated to a temperature of about 1000° C.

After the finished block has been annealed and cooled, the projecting lugs 16 may be ground off in any suitable manner.

A suitable mold may be made by cementing together slabs composed of glass sand bonded with sodium silicate. This precludes the disintegration or burning out of the mold before the cast material has solidified, and hence contributes to the successful production of perfect castings.

By the term "cast refractory" as herein used, I mean a corrosion resistant refractory material which is produced by the fusion of its constituents, usually in an electric furnace, and the pouring of it into a mold while in its liquid state, as fully described in the patent referred to herein. Such material differs in microscopic structure from refractory material produced by sintering.

By the term "molten refractory material" as herein used, I mean the above defined cast refractory in a molten or liquid state.

While I have shown and described in this application only certain refractory articles, it is to be understood that the process may be successfully used in the production of other types of articles, such as feeder bowls, and similar intricate shapes where a relatively thin coating of corrosive-resistant refractory is sufficient to withstand the attack of molten glass, but does not possess the desired resistance to thermal shock or provide the desired thermal insulating qualities, and that minor changes in the details of procedure may be resorted to without departing from the spirit and scope of the invention as defined in the appended claims.

Having thus described my invention, what I claim is:

1. The method of making composite refractory articles for use in contact with molten glass which includes supporting a preformed refractory backing member in the upper part of a suitable mold so as to serve at least in part as the top slab thereof, pouring molten refractory material into the mold to fill completely the space unoccupied by the backing member and annealing the completed article.

2. The method of making composite refractory articles for use in contact with molten glass which includes heating a preformed refractory backing member, supporting it in the upper part of a suitable mold by means of lugs projecting from the sides of the backing member, pouring molten refractory material into the mold so as to fill completely the space unoccupied by the backing member and to cause it to become fused thereto by its own heat and annealing the completed article.

3. The method of making composite refractory articles for use in contact with molten glass which includes pouring molten refractory material through a hole in a preformed refractory backing member so as to form a layer of cast refractory below the backing member, said layer extending through the hole in the backing member and being fused thereto by its own heat.

4. An annealed composite refractory article for use in contact with molten glass which comprises a sintered backing member and a cast aluminum silicate facing fused to and extending through the backing member.

5. An annealed composite refractory article for use in contact with molten glass which comprises a sintered backing member and a cast aluminum silicate facing fused to and extending through the backing member and containing voids only in the extended portion of the casting.

GORDON S. FULCHER.